(12) United States Patent
Zhou et al.

(10) Patent No.: US 9,306,776 B2
(45) Date of Patent: Apr. 5, 2016

(54) FILTERING HIGH SPEED SIGNALS

(71) Applicant: Nvidia Corporation, Santa Clara, CA (US)

(72) Inventors: Yaping Zhou, San Jose, CA (US);
Wenjie Mao, Los Gatos, CA (US);
Huabo Chen, San Jose, CA (US);
Mayan Riat, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 23 days.

(21) Appl. No.: 14/023,207

(22) Filed: Sep. 10, 2013

(65) Prior Publication Data

US 2015/0071333 A1    Mar. 12, 2015

(51) Int. Cl.
*H04B 1/40* (2015.01)
*H04L 25/03* (2006.01)
*H04L 25/02* (2006.01)

(52) U.S. Cl.
CPC ............ *H04L 25/03878* (2013.01); *H04B 1/40* (2013.01); *H04L 25/028* (2013.01); *H04L 25/0292* (2013.01); *H04L 25/03343* (2013.01)

(58) Field of Classification Search
CPC ........................................................ H04B 1/40
USPC ........................................................ 375/219
See application file for complete search history.

(56) References Cited

U.S. PATENT DOCUMENTS

| | | | |
|---|---|---|---|
| 3,614,554 A | 10/1971 | Shield et al. | |
| 5,543,773 A | 8/1996 | Evans et al. | |
| 6,014,066 A * | 1/2000 | Harberts et al. | 333/104 |
| 6,249,039 B1 | 6/2001 | Harvey et al. | |
| 6,310,393 B1 | 10/2001 | Ogura et al. | |
| 6,462,950 B1 | 10/2002 | Pohjonen | |
| 6,512,285 B1 | 1/2003 | Hashemi et al. | |
| 7,952,460 B2 | 5/2011 | Joehren et al. | |
| 2006/0088971 A1 | 4/2006 | Crawford et al. | |
| 2006/0170527 A1 | 8/2006 | Braunisch | |
| 2008/0075974 A1 | 3/2008 | Fajardo et al. | |
| 2010/0265684 A1 * | 10/2010 | Minegishi et al. | 361/783 |
| 2011/0108947 A1 | 5/2011 | Guzek et al. | |
| 2013/0257564 A1 * | 10/2013 | Huang et al. | 333/177 |
| 2014/0001639 A1 * | 1/2014 | Hiraishi et al. | 257/773 |
| 2014/0167898 A1 | 6/2014 | Sturcken et al. | |
| 2014/0251669 A1 * | 9/2014 | Manusharow et al. | 174/260 |
| 2014/0347025 A1 | 11/2014 | Liao | |

OTHER PUBLICATIONS

Patrick R. Morrow, Chang-Min Park, Henry W. Koertzen and J. Ted Dibene, II; "Design and Fabrication of On-Chip Coupled Inductors Integrated With Magnetic Material for Voltage Regulators"; IEEE Transactions on Magnetics, vol. 47, No. 6, Jun. 2011; 9 Pages.

Sturcken; et al.; "A 2.5D Integrated Voltage Regulator Using Coupled-Magnetic-Core Inductors on Silicon Interposer Delivering 10.8A/mm"; ISSCC 2012/Session23/ Advances in Heterogeneous Integration/23.1; 3 Pages.

* cited by examiner

*Primary Examiner* — Michael Neff

(57) ABSTRACT

A method for filtering a data signal includes transmitting the data signal from a transmitter to a receiver across a conductor disposed in an interposer, which interconnects the receiver and the transmitter. The data signal is low-passed with a filter, which includes a passive resistive element disposed within the interposer and coupled in series electrically with a passive inductive element. In relation thereto, the interposer is disposed in a position within the interposer, or upon a surface thereof. The filter is coupled to the conductor in a shunt configuration with respect to ground.

20 Claims, 14 Drawing Sheets

Example Electronic Network 10
(Side View)

Example Eye Diagram 31

Example Single ended Circuit 40

Example Double ended Differential Circuit 400

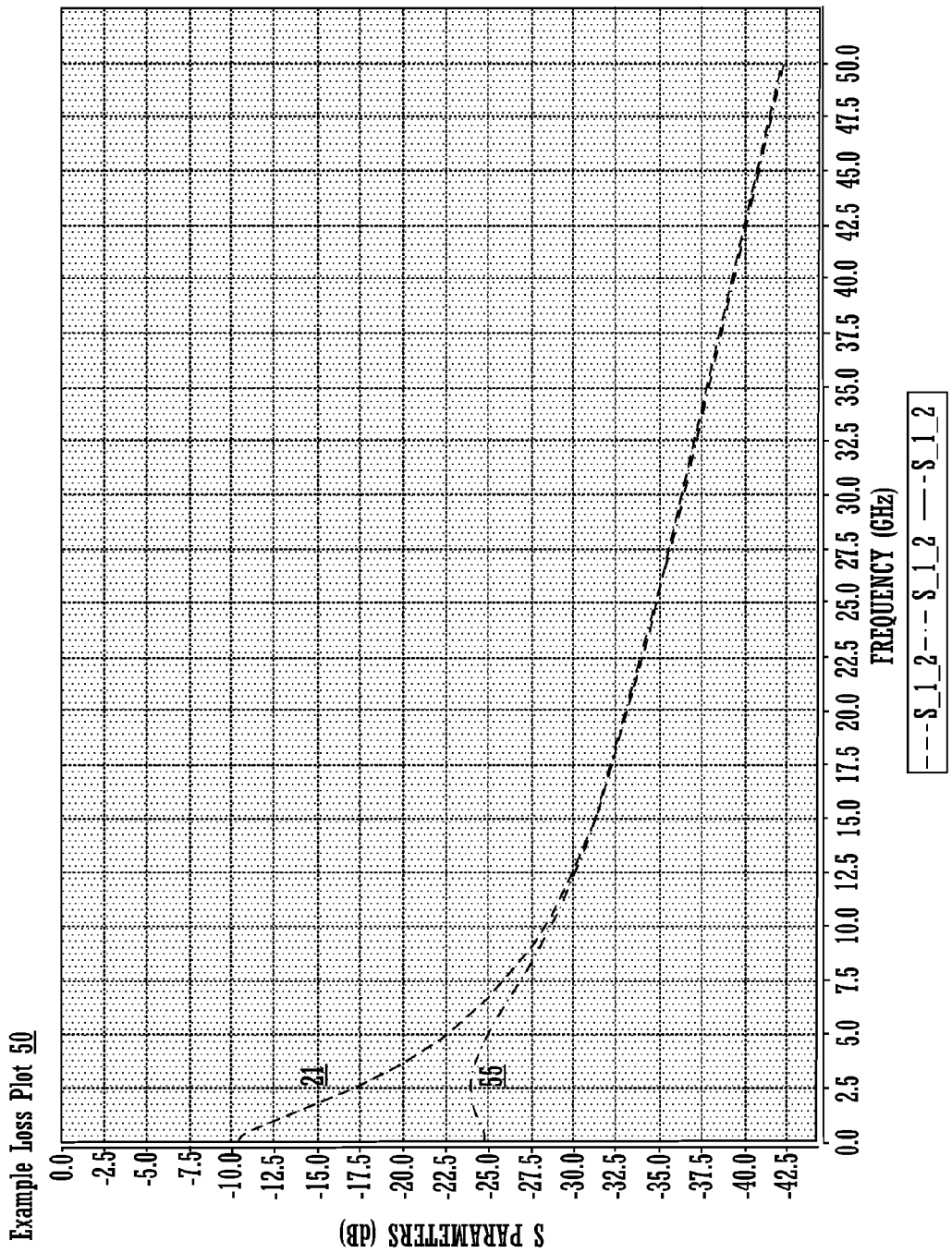

Open Eye With Passive Equalizer

- Passive Equalizer Opens the Eye Significantly

Example Inductive Component 70

Example Inductive Component 80

Example Inductive Component 90

Example Inductive Component 100

Example Signal Filtering Method 1100

Example Circuit Production Process 1200

FILTERING HIGH SPEED SIGNALS

TECHNOLOGY

Embodiments of the present invention relate to signals and circuits. More particularly, an example embodiment of the present invention relates to filtering high speed signals.

BACKGROUND

Integrated circuit (IC) devices include the central processor unit (CPU) or a graphics processing unit (GPU) components used in modern computers. A typical IC device comprises a semiconductor die or substrate. An array of active logic device and addressable memory cell components (e.g., transistors) are disposed within the die or substrate and operably configured into circuitry with an interconnective network of conductive traces, leads and vertical interconnect accesses (vias) disposed within the IC device internally. The components interact with an exchange of data signals over the internal conductive network.

An IC device itself may exchange data signals with one or more other IC devices. In an exchange of data signals, a first IC device operates as a transmitter component and transmits a data signal to at least a second IC device, which thus operates as a receiver component, interactive with the transmitter component in a data exchange network external to each of the at least two IC device components. The data exchanges may comprise single ended transactions or a two-ended exchange, e.g., of a differential signal. The transmitter component and the receiver component may be electrically coupled for the exchange of data signals with one or more conductors.

The electrical conductors may be electrically coupled at each opposite end thereof to one or more micro-bumps, solder balls or other conductive components of a C4 package, a ball grid array (BGA) or another electronic package to which each of the IC devices are mounted electromechanically. Conductive leads electrically couple at least a portion of the active device arrays and other internal components of each of the IC devices to the conductive components of the electronic packages and thus, to the one or more conductors.

The IC device transmitter component and the IC device receiver component are interconnected with a semiconductor interposer component. The conductive components of the electronic package are electromechanically fastened to a surface of the interposer component. The conductors over which data signals are exchanged are disposed, at least over a significant part of their length, within a semiconductor die or substrate of the interposer. The interposer component may itself be fastened to a surface of a printed circuit board (PCB) electromechanically. The interposer conductors may be electrically coupled to one or more other components mounted on the PCB discretely in relation to the interposer component.

The interposer traces may have significant resistance values. Further, the silicon or other semiconductor die, matrix or substrate of the interposer component in which the interposer traces are disposed imposes significant parasitic capacitance as a dielectric material in relation to the traces. The resistance of the traces and the parasitic capacitance of its dielectric matrix contribute to losses over the traces. Thus, the fine interposer traces tend to be quite lossy in relation to sustaining signal strength over their lengths.

Passive equalizers may be used to address the lossiness added by interposer traces to circuits interconnecting IC device transmitter and receiver components. Conventional approaches implement passive equalizers with discrete components installed typically on a PCB, to which the interposer component, with the IC device transmitter and receiver components mounted thereon, is also affixed. Such approaches are described in one or more of the following references:

Zhang, et al. "Analysis and Optimization of Low-Power Passive Equalizers for CPU Memory Links," *IEEE Trans. CPMT*, vol. 1/no. 9, pp. 1406-1420, IEEE (2011);

Sun, et al., "Passive Equalizer Design for Through Silicon Vias with Perfect Compensation," *IEEE Trans. CPMT*, vol. 1/no. 11, pp. 1815-1822 IEEE (2011) and/or Liu, et al. "An Embedded Common-Mode Suppression Filter for GHz Differential Signals using Periodic Detected Ground Plane," *IEEE Microwave Wireless Compon. Lett.*, vol. 18/no. 4, pp. 248-250, IEEE (2008). However, implementing passive equalizers with discrete components installed on a PCB demand board area on the PCB, which can displace other components and/or reduce the overall real estate available on the PCB.

Further, conductive leads and connectors are required on the PCB to interconnect the discrete passive equalizer components with the conductor components interconnecting the IC device transmitter and receiver components. The conductive leads and connectors of the PCB are electrically coupled in some relation to the conductive interposer traces, add their own lossiness thereto and may increase the effective length and lossiness thereof, which may add demands on the size, strengths, current draw and power use by the passive equalizer components.

Some conventional approaches implement passive equalizers with discrete components installed on the electronic packages to which the IC devices of one or more of the transmitter and receiver components are mounted. Implementing passive equalizers with discrete components installed on the electronic packages however demand real estate thereof. Implementing passive equalizers with discrete components installed on the electronic packages also uses conductive components, which may thus become unavailable for other uses.

Approaches described in this Background section could, but have not necessarily been conceived or pursued previously. Unless otherwise indicated, neither approaches described in this section, nor issues identified in relation thereto, are to be assumed as recognized in any prior art merely by the discussion thereof within this section.

SUMMARY

It would be useful to implement a passive equalizer for filtering high speed signals without installing discrete components on a PCB. It would also be useful to implement the passive equalizer without conductive leads or connectors required on the PCB to interconnect the discrete passive equalizer components with the conductor components interconnecting the transmitter and receiver components. Further, it would be useful to implement passive equalizers without discrete components installed on electronic packages to which the transmitter and receiver components are mounted.

An example embodiment of the present invention relates to a method for filtering a data signal. The method includes transmitting the data signal from a transmitter to a receiver across a conductor disposed in an interposer, which interconnects the receiver and the transmitter. The data signal is low-passed with a filter, which includes a passive resistive element disposed within the interposer and coupled in series electrically with a passive inductive element. In relation thereto, the interposer is disposed in a position within the interposer, or upon a surface thereof. The filter is electrically coupled to the conductor in a shunt configuration with respect to a ground.

The data signal may comprise a single ended transaction between the transmitter and the receiver over a single conductor or a two-ended differential signal over a pair of conductors.

The conductor may comprise a first conductor of multiple conductors. The interposer may comprise a second conductor of the multiple conductors, which interconnects the receiver and the transmitter, disposed in the interposer. The data signal may comprise a two ended differential signal between a first signal component and a second signal component. The transmitting comprises sending the first signal component across the first conductor, as well as sending the second signal component across the second conductor.

Example embodiments of the present invention described herein also relate to circuits or means operable for performing the method described above and to methods for producing such a circuit.

Thus, example embodiment of the present inventions implements a passive equalizer for filtering high speed signals without installing discrete components on a PCB. This avoids displacing other components or decreasing available PCB board area.

The passive equalizer is implemented without conductive leads or connectors required on the PCB to interconnect the discrete passive equalizer components with the conductor components interconnecting the transmitter and receiver components. This avoids conductive leads and connectors of the PCB electrically coupled in some relation to the conductive interposer traces and adding their own lossiness thereto, increasing the effective length or lossiness thereof, or adding demands on the size, strengths, current draw and power use by the passive equalizer components.

Further, a passive equalizer is implemented without discrete components installed on electronic packages to which the transmitter and receiver components are mounted. This saves real estate on the electronic packages to which the IC devices may be coupled electrically and extends package availability for other uses.

BRIEF DESCRIPTION OF THE DRAWINGS

The accompanying drawings described in this section comprise a part of the specification herein of example embodiments of the present invention and are used for explaining features, elements and attributes thereof. Principles of example embodiments are described herein with reference to each of these drawings, in which like numbers are used to reference like items, and in which:

FIG. 5 depicts an example loss plot, according to an embodiment of the present invention;

Figure 1A:
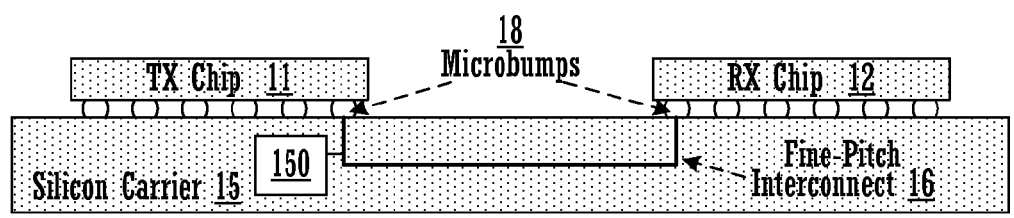
FIG. 1A depicts a side view of an example interposer-connected electronic communication network, with which an embodiment of the present invention may be practiced.

Unless otherwise expressly designated, the figures are rendered without reference to any particular scale.

DESCRIPTION OF EXAMPLE EMBODIMENTS

Overview and Nomenclature

An embodiment of the present invention relates to filtering high speed signals. A method for filtering a data signal includes transmitting the data signal from a transmitter to a receiver across a conductor disposed in an interposer, which interconnects the receiver and the transmitter. The data signal is low-passed with a filter, which includes a passive resistive element disposed within the interposer and coupled in series electrically with a passive inductive element. In relation thereto, the interposer is disposed in a position within the interposer, or upon a surface thereof. The filter is electrically coupled to the conductor in a shunt configuration with respect to a ground. The data signal may comprise a single ended transaction between the transmitter and the receiver over a single conductor or a two-ended differential signal over a pair of conductors.

Reference will now be made in detail to implementations of the example embodiments as illustrated in the accompanying drawings. The same reference numbers will be used to the extent possible throughout the drawings and the following description to refer to the same or like items. It will be apparent to artisans of ordinary skill in technologies that relate to semiconductors however, that example embodiments of the present invention may be practiced without some of these specifically described details. Example embodiments of the present invention are described in relation to filtering a high speed signal.

For focus, clarity and brevity, as well as to avoid unnecessarily occluding, obscuring, obstructing or obfuscating features that may be somewhat more germane to, or significant in explaining example embodiments of the present invention, this description may avoid discussing some well-known processes, structures, components and devices in exhaustive detail. Artisans of ordinary skill in electronics related technologies should realize that the following description is made for purposes of explanation and illustration and is not intended to be limiting in any way. On the contrary; other embodiments should readily suggest themselves to artisans of such skill in relation to the example features and elements described herein and any corresponding benefits such embodiments may achieve.

One or more principles related to the invention may be described herein with reference to eye diagrams. Channel noise and inter-symbol interference (ISI) may each or together affect the performance of signal propagation routes in electronics. The presence and effects of ISI and noise may be tested, monitored, evaluated and studied (e.g., experimentally) with an eye pattern type display of signal oscillations. As used herein, an eye pattern diagram represents a repetitively sampled digital data signal amplitude as a function of time.

For example, an oscilloscopic eye pattern traces (e.g., eye patters 31, 36, 61, 66; FIG. 3A, 3B, 6A, 6B, respectively) may represent a sampled signal input on a vertical axis, with a sweep over its horizontal axis based on the data rate of the signal. Eye patters thus diagram a synchronized superposition of possible realizations of a target or specimen signal over a given time interval or signal duration. An "open" eye pattern may represent a signal with minimal distortion. On the other hand, ISI and noise in a signal waveform tend to "close" the eye pattern thereof.

Example Platform

Figure 1B:
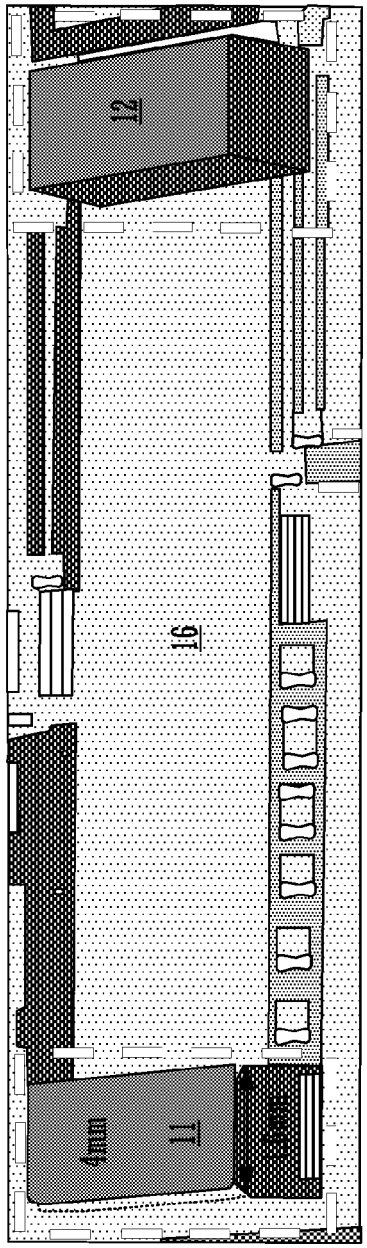
FIG. 1B depicts a top view of the example interposer-connected electronic communication network, with which an embodiment of the present invention may be practiced.

Example embodiments of the present invention relate to filtering a high speed signal. FIG. 1A and FIG. 1B depict side and top views respectively of an example interposer-connected electronic communication network 10, with which an embodiment of the present invention may be practiced. Communication network 10 has a first IC device component 11 and a second IC device component 12, which interact together with an exchange of data signals across the network. IC component 11 is operable as a transmitter for sending signals to IC component 12, which is operable as a receiver of the signals.

The transmitter IC component 11 thus transmits the data signal to at least a second IC device, which operates as a receiver component 12, interactive with the transmitter component 11 in a data exchange network 10 external to each of the at least two IC device components. The data exchanges may comprise single ended transactions or a two-ended exchange, such as a differential signal. The transmitter component and the receiver component may be electrically coupled for the exchange of data signals with one or more conductors 16, which include a fine pitch interconnect and conductive mounting pads 17 and 18 of the IC device components.

The electrical conductors 16 may be electrically coupled at each opposite end thereof to one or more micro-bumps, solder balls or other conductive components 17 and 18 of a C4 package, a ball grid array (BGA) or another electronic package to which each of the IC devices are mounted electromechanically. The conductive leads 16 electrically couple at least a portion of the active device arrays and other internal components of each of the IC devices 11 and 12 to the conductive components 17 and 18 respectively of the electronic packages and thus, to the one or more conductors.

The IC device transmitter component 11 and the IC device receiver component 12 are interconnected with a semiconductor interposer component 15. The conductive components 17 and 18 of the electronic packages are electromechanically fastened to a surface of the interposer component. The conductors 16 over which data signals are exchanged are disposed, at least over a significant part of their length, within a semiconductor die or substrate of the interposer 15. The interposer component 15 may itself be fastened to a surface of a printed circuit board (PCB) electromechanically. The interposer conductors 16 may be electrically coupled to one or more other components mounted on the PCB discretely in relation to the interposer component 15.

The interposer component 15 may comprise a significant size or form factor in relation to the transmitter and receiver components 11 and 12 and the conductive components 17 and 18 of their packages. The interposer 15, example, may cover an area approximately 10-16 millimeters (mm) long and 5-6 mm wide. An approximately 2 mm by 2 mm square at each end of the long dimension are covered by the electronic packages to which each of the IC device components 11 and 12 are mounted. The interposer traces spanned by the conductors 16 interconnecting the receiver and transmitter components 11 and 12 may thus span significant lengths of as much as approximately 10-14 mm, in relation to a gauge, width or cross-sectional area of significant fineness.

Such long, fine interposer traces 16 may have significant resistance values. Further, the silicon or other semiconductor die, matrix or substrate of the interposer component 15 in which the interposer traces 16 are disposed may impose a parasitic capacitance as a dielectric material in relation to the traces 16. The resistance of the traces and the parasitic capacitance of its dielectric matrix contribute to losses over the traces. Thus, the fine interposer traces tend to be quite lossy in relation to sustaining signal strength over their lengths.

Figure 2:
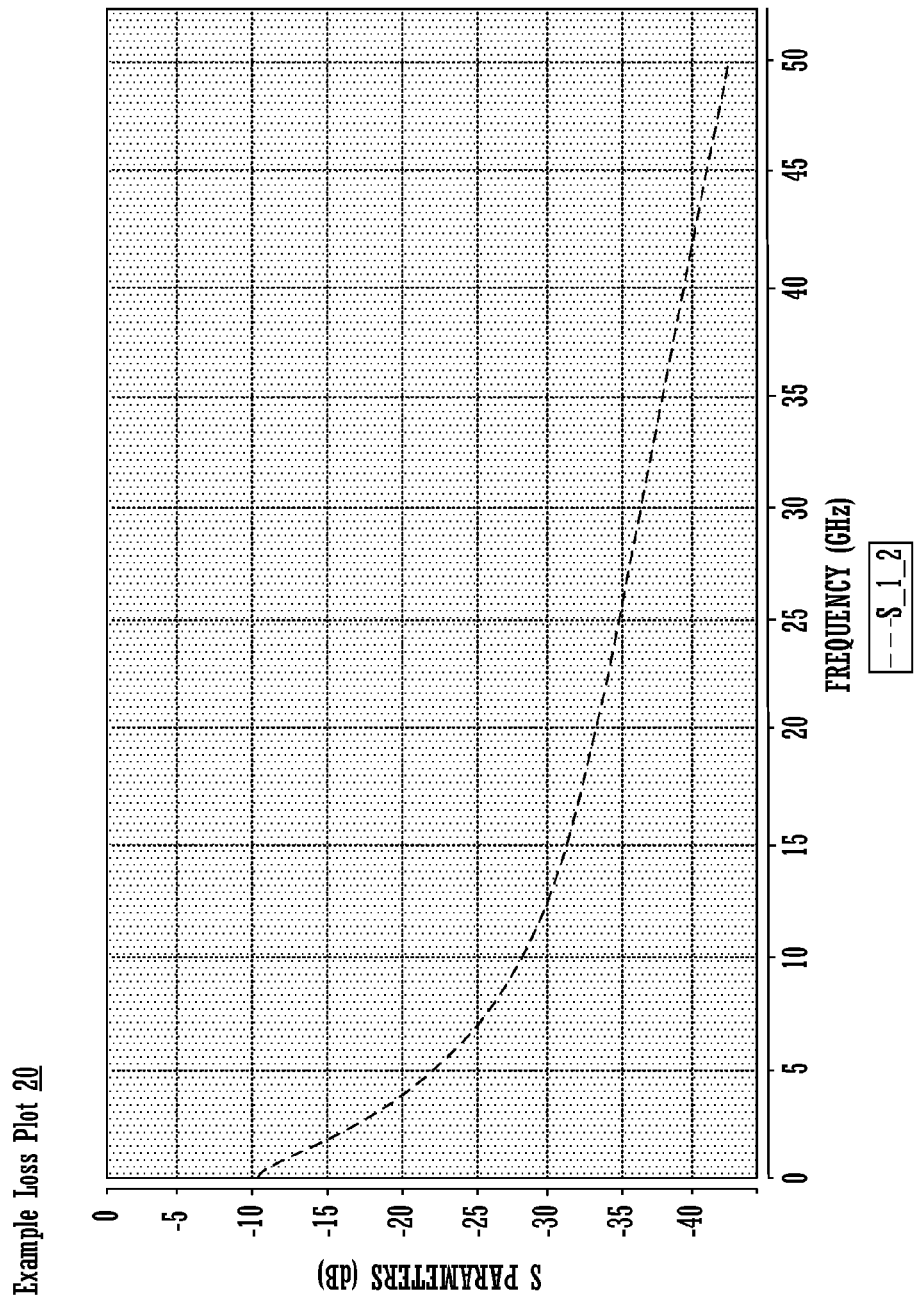
FIG. 2 depicts an example loss plot.
Figure 3A:
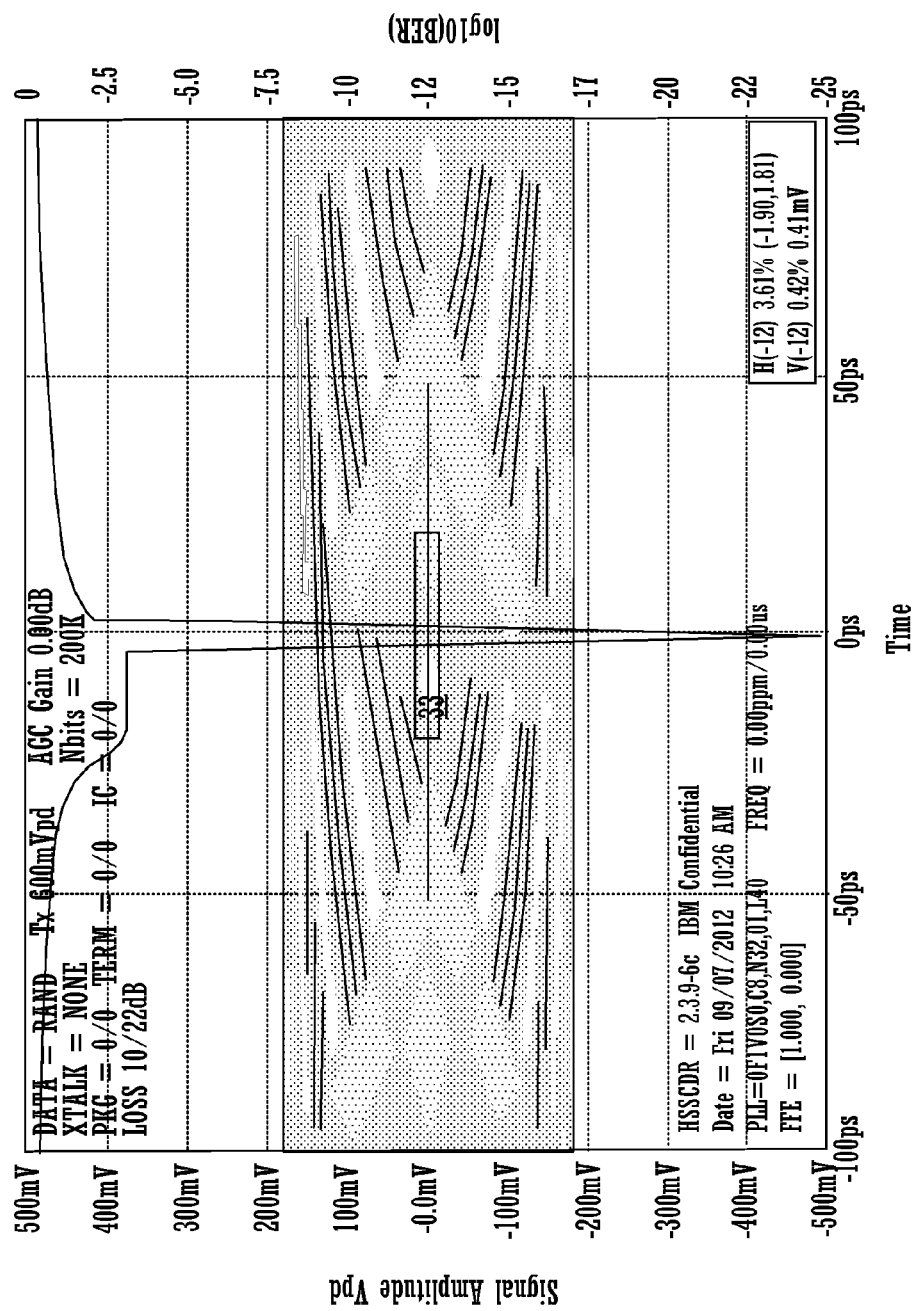
FIG. 3A depicts an example eye diagram associated with the loss plot of FIG. 2.
Figure 3B:
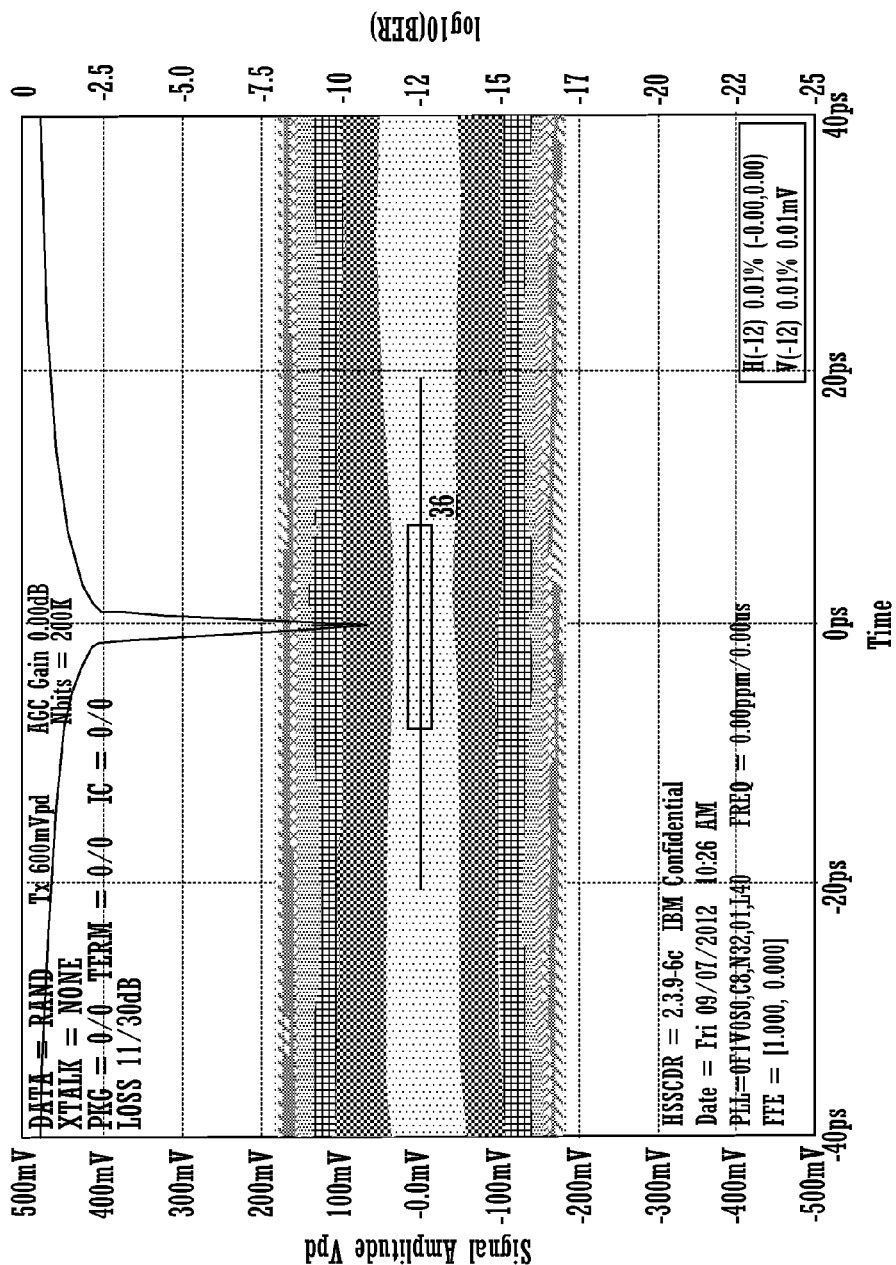
FIG. 3B depicts an example eye diagram associated with the loss plot of FIG. 2.

For example, a typical differential conductor may be 10 mm long have a cross-sectional area of 1 micrometer (μm) by 1 μm and may be disposed in a silicon dielectric matrix of an interposer. Such a conductor may be expected to sustain an insertion loss of over 30 Decibels (dB) over frequencies between zero and 50 Gigahertz (GHz). FIG. 2 depicts an example loss plot 20, and FIG. 3A and FIG. 3B each depict example eye diagrams 31 and 36 associated therewith. As shown in the closed eye diagrams, this differential pair may fail to adequately support a bit rate of 10 Gbps ($10^9$ bits per second), much less bit rates two or three times higher. The eye 33 of eye diagram 31 is substantially closed at the 10 Gbps bit rate. At 25 Gpbs, the eye 38 of eye diagram 36 is nearly completely closed.

An example embodiment of the present invention may be implemented in which a passive equalizer circuit 150 is disposed within the interposer component 150. The passive equalizer circuit filters high speed single ended and/or differential signals exchanged between the transmitter component 11 and the receiver component 12. The passive equalizer circuit 150 may comprise an inductive and resistive elements electrically coupled in series and with conductors 16 in a shunt configuration with respect to a ground potential. The circuit 150 may be electrically coupled to one or more of conductors 16 at any point over their length, e.g., within the interposer component 15. The passive equalizer circuit 150 is operable for low-passing high speed signals conducted over the one or more of conductors 16 and thus, for filtering high frequency noise transients that may affect the signals. An example embodiment thus relates to a circuit for filtering a signal.

Example Circuits

Figure 4A:
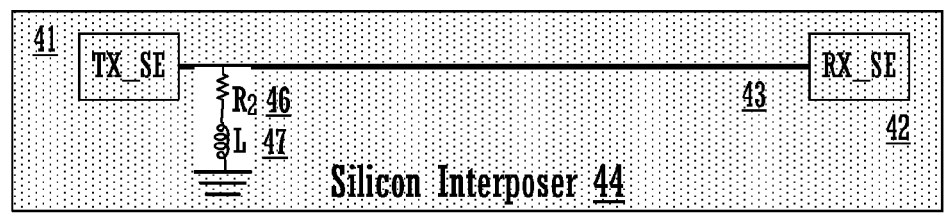
FIG. 4A depicts an example single ended signal exchange circuit, according to an embodiment of the present invention.
Figure 4B:
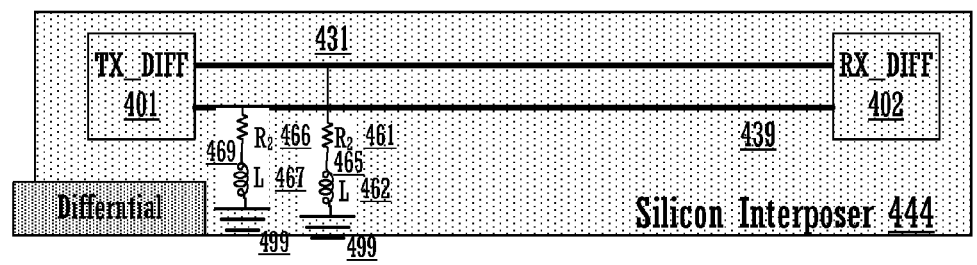
FIG. 4B depicts an example double ended differential signal exchange circuit, according to an embodiment of the present invention.

An example embodiment of the present invention relates to a circuit for filtering a signal. FIG. 4A and FIG. 4B depict a single ended signal exchange circuit 40 and a double ended differential signal exchange circuit 400 respectively, according to an example embodiment of the present invention. With reference to FIG. 4A, circuit 40 comprises a transmitter (Tx) component 41 and a receiver (Rx) component 42. With reference to FIG. 4B, circuit 400 comprises a transmitter (Tx) component 401 and a receiver (Rx) component 402.

With reference to FIG. 4A, circuit 40 and circuit 400 are each operable for filtering a data signal. Circuit 40 and circuit 400 each include an interposer component (44 and 444, respectively), which each have multiple conductors (respectively: 43 and the pair 431, 439) disposed within a semiconductor substrate such as silicon.

Circuit 40 has a receiver component 42 electrically coupled to a first end of at least one of the multiple conductors 43. A transmitter component 41 is electrically coupled to a second end of the at least one of the conductors 43. Transmitter 41 is and interactively operable with the receiver component 42 over the at least one conductor for an exchanging of the data signal, which may comprise a single ended data transaction between the transmitter 41 and the receiver 42.

Circuit 40 has a filter component 45 disposed within the interposer component 44. The filter 45 is electrically coupled to the at least one of the conductors 43, in a shunt configuration with respect to a ground potential 49 (e.g., grounded chassis, earth ground). The filter 45 has a passive inductive device (e.g., element) 47 coupled electrically in series with a passive resistive element 46. The inductive device may include an inductor and may be disposed within the interposer 44 or upon a surface thereof. The resistive element 45 may include a resistor and may be disposed within the interposer 44. The resistive element 45 is electrically coupled to the at least one conductor 43 at an end, opposite from which it is coupled to the inductive element 47. The filter 45 is operable for low-passing the data signal.

The filter 45 and may be coupled electrically to the at least one of the conductors 43 at any point along its length (e.g., within the interposer 44). Thus, the filter component 45 is coupled to the at least one conductor 43 at a location more proximately in relation to at least one of the first end, the second end, or a position between the first end and the second end of the conductor 43.

With reference to FIG. 4B circuit 400 is also operable for filtering a data signal. Circuit 400 includes an interposer component 444, which has multiple conductors including at least a pair 431 and 439, which disposed within silicon or another semiconductor substrate.

Circuit 400 has a receiver component 402 electrically coupled to a first end of at least one of the pair of multiple conductors 431. A transmitter component 401 is electrically coupled to a first end of the first conductor 431 of the at least a pair of multiple conductors and to a second end of a second conductor 439 of the conductor pair. Transmitter 401 is interactively operable with the receiver component 402 over the at least pair of conductors 431 and 439 for an exchanging of one or more data signals, which may comprise a two ended differential signal exchanged between the transmitter 401 and the receiver 402.

Circuit 400 has a first filter component 465 disposed within the interposer component 444. The first filter 465 is electrically coupled to the first conductors 431 in a shunt configuration with respect to a ground potential 499 (e.g., grounded chassis, earth ground). The first filter 465 has a first passive inductive element (e.g., device) 462 coupled electrically in series with a first passive resistive element 461.

Circuit 400 also has a second filter component 469 disposed within the interposer component 444. The second filter 469 is electrically coupled to the second conductor 439 of the conductor pair in a shunt configuration with respect to the ground potential 499. The second filter 469 has a second passive inductive element 467 coupled electrically in series with a second resistive element 466.

Each of the inductive devices may include an inductor and may be disposed within the interposer 444 or upon a surface thereof. The resistive elements 461 and 466 may include a resistor and may be disposed within the interposer 444. The resistive elements 461 and 466 are each electrically coupled to the first and second conductors 431 and 439 at an end, opposite from which they are coupled respectively to the passive inductive elements 462 and 467. The filters 465 and 469 are each operable for low-passing the data signals exchanged over each of their respective conductors 431 and 439.

The filters 465 and 469 may be coupled electrically to each of the first and second conductors 431 and 439 respectively at any point along each of their lengths (e.g., within the interposer 444), and each of the electrical coupling points may have distinct or independent positions from each other within the interposer 444, or they may be positioned in proximity to each other. Thus, each of the filter components 465 and 469 may be coupled electrically to the respective conductors 431 and 439 at one or more locations, each of which may be more proximately disposed in relation to at least one of the first end, the second end, or a position between the first end and the second end of each of the conductors 431 and 439.

Thus, the multiple conductors include at least a pair of conductors, which has a first conductor 431 and second conductor 432. The receiver component 402 is electrically coupled to the second end of the first conductor 431 and further electrically coupled to a first end of the second conductor 432 (or vice versa). The transmitter component 401 is electrically coupled to a first end of the first conductor 431 and further electrically coupled to a second end of the second conductor 439. The exchanging of the data signal comprises a differential exchange between the transmitter component 401 and the receiver component 402, using each of the first conductor 431 and the second conductor 432 of the pair of multiple conductors.

Circuit 400 has at least a pair of filter components, which include a first filter component 465 and a second filter component 469. The first filter 465 is electrically coupled to the first conductor 431. The second filter 469 is electrically coupled to the second conductor. Each of the filters 465 and 469 is electrically coupled to each of the conductors 431 and 439 respectively, in a shunt configuration with respect to a ground potential 499. Each of the filters 465 and 469 is operable for low-passing the data signal carried on each of the conductors 431 and 439, respectively.

With reference to FIG. 4A and FIG. 4B, one or more of the interposer components 40 or 400 may comprise one or more metal layers disposed within the substrate of the interposers. In an example embodiment, one or more of the passive resistive elements 46, 461 or 466 is configured from at least one of the one or more metal layers. In an example embodiment, the passive inductive devices 47, 462 and 467 of the filter components 45, and 465, 469, respectively are disposed within the interposer component 444.

Figure 6A:
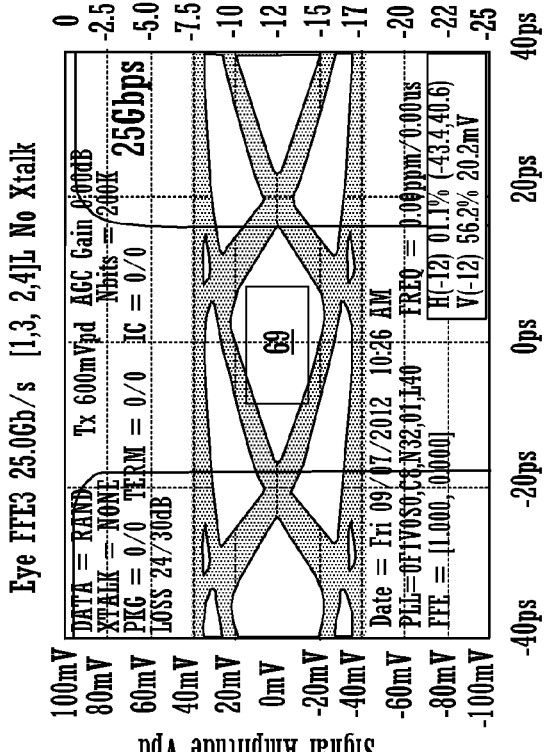
FIG. 6A depicts an example eye diagram associated with the loss plot of FIG. 5, according to an embodiment of the present invention.
Figure 6B:
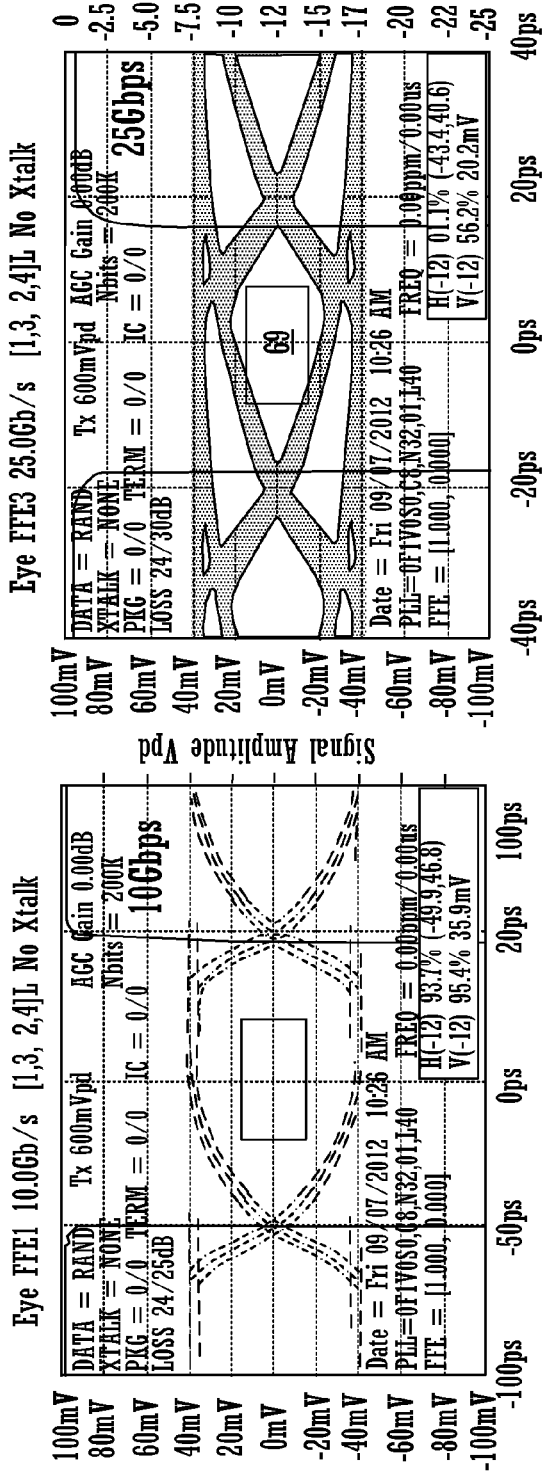
FIG. 6B depicts an example eye diagram associated with the loss plot of FIG. 5, according to an embodiment of the present invention.

FIG. 5 depicts an example loss plot 50, and FIG. 6A and FIG. 6B each depict example eye diagrams 61 and 66 associated therewith, according to an example embodiment of the present invention. The loss plot 50 shows the loss 21 associated with an un-equalized or unfiltered circuit (e.g., as in FIG. 2), as well as a second loss 55. The second loss plot 55 may correspond to the differential conductor of 10 mm length and 1 μm by 1 μm, disposed in the silicon dielectric matrix of an interposer (e.g., as in plot 21). However, a passive equalizer component is added to the circuit according to an example embodiment of the present invention. The passive equalizer has a resistive element with a resistance value of 20 Ohms (Ω) and an inductance value of one Nanohenry (1 nH). Thus, loss plot 55 shows an improvement over loss plot 21 of as much as 15 dB over the frequencies between zero and 10 GHz. with a passive equalizer operable for low-passing the data signals in accordance with an example embodiment.

FIG. 6A and FIG. 6B respectively depict example eye diagrams 61 and 66, which are associated with loss plot 55 and the equalized circuit it represents associated therewith. As shown in the closed eye diagrams, filtering the differential conductor pair with a passive equalizer according to an example embodiment opens the eyes 65 and 69 significantly (e.g., in relation to the closed eyes shown in FIG. 2A, 2B). Thus, the differential conductors may adequately support the 10 Gbps bit rate and may suffice to support bit rates as high as 25 Gbps.

In an example embodiment, the resistive elements of the filters (45, 461, 466, etc.) are implemented on one or more of multiple metal layers disposed within the semiconductor matrix of the interposer (44, 444, etc.). For example a first metal layer M1 of a silicon interposer may have a thickness of 0.75 µm and a width of 0.42 µm. Thus, a resistive element with a resistance value of 55Ω may be configured for the filters from a 1 mm long portion of the 0.75 µm by 0.42 µm trace. An example embodiment may be implemented in which one or more voiding planes are disposed in the semiconductor interposer substrate proximate to the resistors, which minimizes parasitic dielectric capacitance effects of the silicon.

An example embodiment may be implemented in which one or more resistive elements of one or more filters are disposed within the interposer. An example embodiment may be implemented in which one or more passive inductive elements of one or more filters is disposed within the interposer or upon a surface thereof. FIG. 7, FIG. 8, FIG. 9 and FIG. 10 each depict an example inductive element, according to an example embodiment of the present invention. In an example embodiment, the inductive elements have inductive winding, which may be wound in a helical or spiral configuration.

The inductive winding may be wound about a magnetically permeable core, which may comprise a ferri-magnetic material such as a ferrite. The magnetically permeable core may be disposed within or on a surface of the interposer. In applications where high frequency performance, core hysteresis or eddy currents may not be significant considerations, an example embodiment may be implemented in which the magnetically permeable core may also or alternatively comprise a ferro-magnetic material such as a high permeability steel alloy, which may be laminated to reduce eddy current losses.

Figure 7:
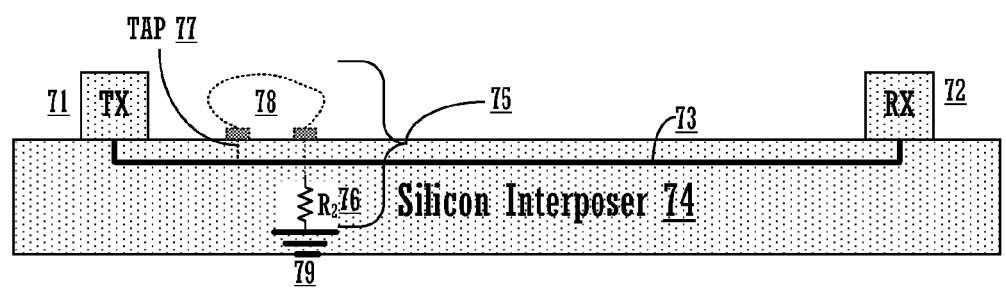
FIG. 7 depicts an example inductive component, according to an embodiment of the present invention.

FIG. 7 depicts an example inductive component 72, according to an example embodiment of the present invention. An example embodiment may be implemented in which one or more resistive elements 76 of a filter 75 are disposed within the interposer 74 and one or more passive inductive elements 78 of one or more filters 75 is disposed upon the surface of the interposer 74. The filter 75 is operable to low-pass a single ended signal exchanged between a transmitter 71 and the receiver 72 over a conductor 73. The inductive element 78 may be implemented with a wire-bond winding.

A first end of the wire-bond winding may be coupled electrically in series with a first end of the resistive element 76 and a second end of the wire bond winding may be electrically coupled at an available point along the length of the conductor 73 in a shunt configuration with respect to a ground potential 79, to which the second end of the resistive element 76 is coupled. A wire-bond winding with a length of 1 mm may implement an inductance value approximating 1 nH.

The wire-bond winding may be routed to the conductor 73 and/or the resistor 76 through a vertical interconnect access (via), which may comprise a through-silicon via (TSV) routed at least partially through the interposer. The wire-bond winding may be coupled electrically to the conductor 73 and/or the resistor 76 with a pair of bond pads disposed on the interposer surface, e.g., proximate to the wire-bond winding. An example embodiment may be implemented with one or more voiding planes disposed within the semiconductor substrate of the interposer 74 to minimize parasitic dielectric capacitance associated with the silicon. An example embodiment may include molding and/or shielding.

Figure 8:
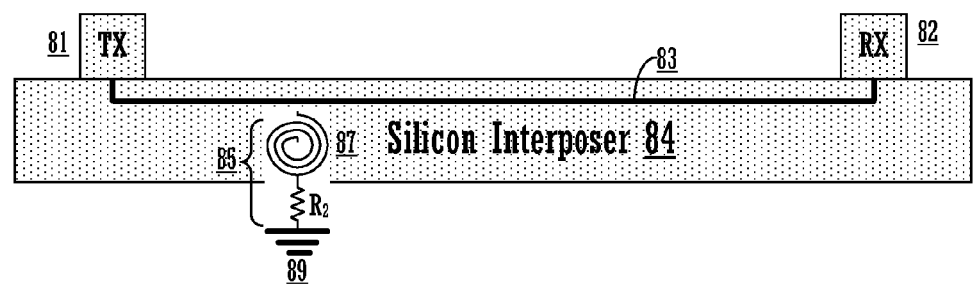
FIG. 8 depicts an example inductive component, according to an embodiment of the present invention.

An example embodiment may be implemented in which one or more resistive elements 88 of and one or more passive inductive elements 87 of a filter 85 are disposed within the interposer 84. One or more filters 85 comprise a spiral inductor 87, which is also disposed within the interposer 84. FIG. 8 depicts an example inductive component 87, according to an example embodiment of the present invention. The spiral inductors 87 may comprise an inductive winding, which is wound in a spiral configuration. The filters 85 are operable to low-pass a single ended signal exchanged between a transmitter 81 and the receiver 82 over a conductor 83. An example embodiment may be implemented with one or more voiding planes disposed within the semiconductor substrate of the interposer 84 to minimize parasitic dielectric capacitance associated with the silicon.

Figure 9:
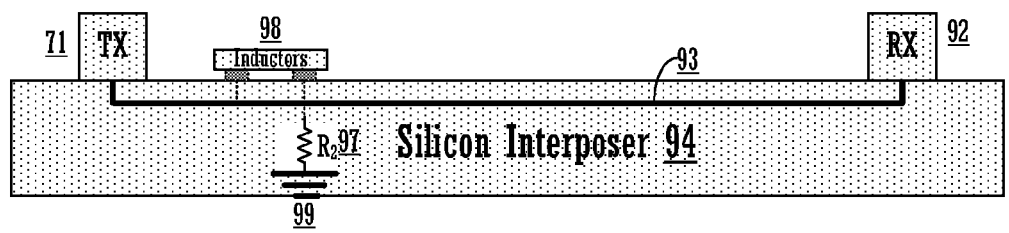
FIG. 9 depicts an example inductive component, according to an example embodiment of the present invention.

FIG. 9 depicts an example inductive component 98, according to an example embodiment of the present invention. An example embodiment may be implemented in which one or more resistive elements 97 of a filter 95 are disposed within the interposer 94 and one or more passive inductive elements 98 of the filter 95 is disposed upon the surface of the interposer 94. The inductive elements 98 comprise a discrete component for surface mounting upon the surface of the interposer 94, e.g., using conductive pads disposed thereon. The discrete passive inductive elements 98 may comprise their own internal windings, which may be wound about a magnetically permeable core also disposed internally thereto. The filter 95 is operable to low-pass a single ended signal exchanged between a transmitter 91 and the receiver 92 over a conductor 93.

A first end of the inductive element 98 may be coupled electrically in series with a first end of the resistive element 97 and a second end of the inductive element 98 may be electrically coupled at an available point along the length of the conductor 93 in a shunt configuration with respect to a ground potential 99, to which the second end of the resistive element 97 is coupled.

Leads of the discrete inductive component 98 may be routed to the conductor 93 and/or the resistor 97 through one or more vias, which may comprise a TSV routed at least partially through the interposer 94. The wire-bond winding may be coupled electrically to the conductor 93 and/or the resistor 97 with a pair of bond pads disposed on the interposer surface, e.g., proximate to the discrete inductive component 98. An example embodiment may be implemented with one or more voiding planes disposed within the semiconductor substrate of the interposer 94 to minimize parasitic dielectric capacitance associated with the silicon. An example embodiment may be implemented in which the discrete inductive element 98 self-resonates at a frequency that exceeds a Nyquist frequency (e.g., at least twice the maximum frequency) of the signals exchanged between the transmitter 91 and the receiver 92.

Figure 10:
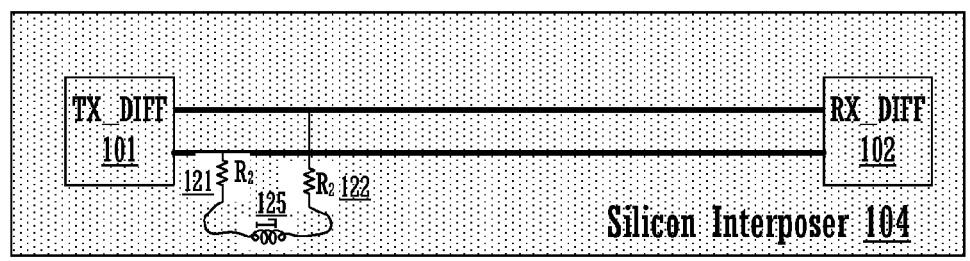
FIG. 10 depicts an example inductive component, according to an example embodiment of the present invention.

FIG. 10 depicts an example inductive element 122, according to an example embodiment of the present invention. At least a first resistive element 121 and a second resistive element 122 of a filter 125 are disposed within an interposer 124. An example embodiment may be implemented in which one or more passive inductive elements of one or more filters are disposed within the interposer or upon a surface thereof. At least a pair of conductors 103 and 113 electrically couple a transmitter 101 and a receiver 102 for exchanging a double ended differential signal, with which they may interact.

The differential signal may comprise a pair of signal components (e.g., a 'P' or positive and a 'N' or negative component). Each signal component of the pair is conducted separately over each of a pair of conductors 103 and 113. In an example embodiment, filter 125 is operable for low-passing the differential across both of the signal components.

An example embodiment may thus be implemented in which a first end of resistor 121 is electrically coupled to the trace 113 and the first end of resistor 122 is electrically coupled to the trace 103. The second end of each of the resistors 121 and 122 is electrically coupled to each end of the windings of an inductive element 122. The inductive element 122 may be disposed within the interposer 104 (or alternatively, upon a surface thereof). In an example embodiment, the differential signals essentially create a virtual ground potential between the signal components.

In an example embodiment, each of at least a pair filters (e.g., represented by filter 125) may be operable for respectively low-passing the differential across each of the signal components. The filters 105 each have at least one inductive winding, which may be wound in a helical or spiral configuration and/or using a discrete inductive component disposed upon the surface of the interposer 104.

Example Signal Filtering Method

Figure 11:
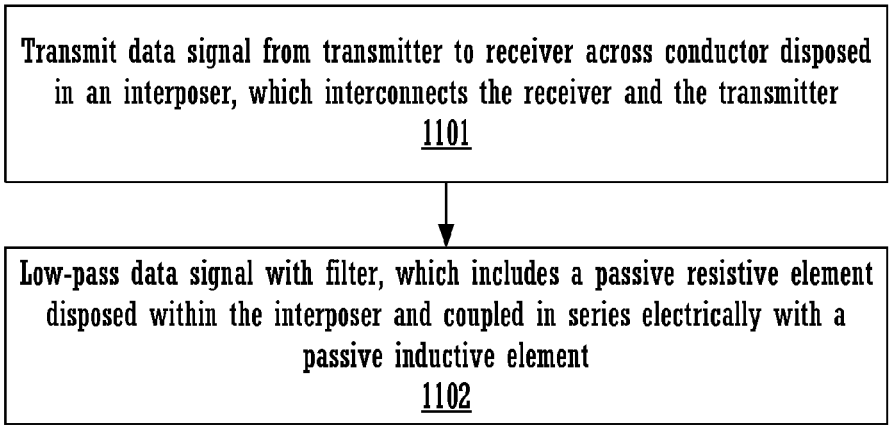
FIG. 11 depicts a flowchart of an example method for filtering a signal, according to an embodiment of the present invention.

FIG. 11 depicts a flowchart of an example method 1100 for filtering a signal, according to an embodiment of the present invention. In step 1101, a data signal is transmitted from a transmitter to a receiver across a conductor disposed in an interposer, which interconnects the receiver and the transmitter.

In step 1102, the data signal is low-passed with a filter, which comprises a passive resistive element disposed within the interposer and coupled in series electrically with a passive inductive element. In relation to the interposer, the passive inductive element is disposed in at least one of a position within the interposer, or upon a surface of the interposer. The filter is electrically coupled to the conductor in a shunt configuration with respect to a ground potential.

The data signal may comprise a single ended transaction between the transmitter and the receiver. The conductor may comprise a first conductor of a conductor pair. The interposer also comprises a second conductor of the pair, which interconnects the receiver and the transmitter, disposed in the interposer. The data signal comprises a differential between a first signal component and a second signal component. The transmitting step 1101 comprises sending the first signal component across the first conductor, and further comprises sending the second signal component across the second conductor.

Example Circuit Production Process

Figure 12:
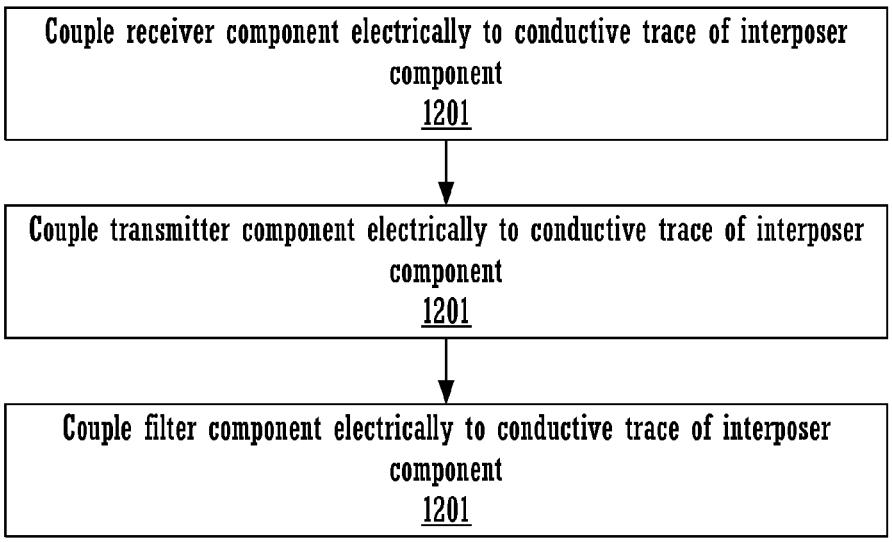
FIG. 12 depicts a flowchart of an example circuit production process, according to an embodiment of the present invention.

FIG. 12 depicts a flowchart of an example process 1200 for producing a circuit, according to an embodiment of the present invention. In step 1201, a receiver component is coupled electrically to an interposer component. In step 1202, a transmitter component is coupled electrically to the interposer component.

The interposer component interconnects the receiver component and the transmitter component. The transmitter component is operable for transmitting a data signal to the receiver component across a conductive medium disposed in the interposer component.

In step 1203, a filter component is coupled to the conductive medium. The filter component comprises a passive resistive element disposed within the interposer component, and a passive inductive element coupled in series electrically with the passive resistive element. In relation to the interposer component, at least a component of the filter component is disposed in at least one of a position therein, or upon a surface thereon. The filter is electrically coupled to the conductive medium in a shunt configuration with respect to a ground and operable for low-passing the data signal.

Thus, an example embodiment of the present invention is described in relation to filtering a data signal. The method includes transmitting the data signal from a transmitter to a receiver across a conductor disposed in an interposer, which interconnects the receiver and the transmitter. The data signal is low-passed with a filter, which includes a passive resistive element disposed within the interposer and coupled in series electrically with a passive inductive element. In relation thereto, the interposer is disposed in a position within the interposer, or upon a surface thereof. The filter is electrically coupled to the conductor in a shunt configuration with respect to a ground. The data signal may comprise a single ended transaction between the transmitter and the receiver over a single conductor or a two-ended differential signal over a pair of conductors. Example embodiments also relate to circuits and related means operable for performing the method and to a process for producing such a circuit.

Definitions that are expressly set forth in each or any claim specifically or by way of example herein, for terms contained in relation to features of such claims are intended to govern the meaning of such terms. Thus, no limitation, element, property, feature, advantage or attribute that is not expressly recited in a claim should limit the scope of such claim in any way. The specification and drawings are, accordingly, to be regarded in an illustrative rather than a restrictive sense.

Example embodiments of the present invention are thus described in relation to filtering a data signal. In the foregoing specification, example embodiments of the present invention are described with reference to numerous specific details that may vary between implementations. Thus, the sole and exclusive indicator of that, which embodies the invention, and is intended by the Applicants to comprise an embodiment thereof, is the set of claims that issue from this application, in the specific form in which such claims issue, including any subsequent correction.

What is claimed is:

1. A circuit comprising:
    an interposer component comprising a plurality of conductors disposed within a semiconductor substrate;
    a receiver component electrically coupled to a first end of at least one of the plurality of conductors;
    a transmitter component electrically coupled to a second end of the at least one of the plurality of conductors and configured to exchange a data signal with the receiver component; and
    a filter component configured to filter the data signal, wherein the filter component comprises a passive inductive device that is coupled electrically in series with a passive resistive device, wherein the passive resistive device is disposed within the interposer component, wherein the filter component is electrically coupled to the at least one of the plurality of conductors in a shunt configuration with respect to a ground potential.

2. The circuit as recited in claim 1 wherein the filter component is coupled to the at least one conductor at a location thereof more proximately to the first end.

3. The circuit as recited in claim 1 wherein the exchanging the data signal comprises a single ended transaction.

4. The circuit as recited in claim 1 wherein the plurality of conductors comprises a second conductor, wherein the receiver component is further coupled to a first end of the second conductor, and wherein the transmitter component is further coupled to a second end of the second conductor.

5. The circuit as recited in claim 4 wherein the exchanging the data signal comprises a differential exchange using each of the first conductor and the second conductor.

6. The circuit as recited in claim 4 wherein the filter component comprises a pair of filter components, and wherein a second filter component of the pair is coupled to the second conductor, with a shunt configuration in relation to ground.

7. The circuit as recited in claim 6 wherein the second filter component is coupled to the second conductor at a contact point proximate to the first end of the second conductor.

8. The circuit as recited in claim 1 wherein the interposer component comprises a plurality of metal layers disposed within the semiconductor substrate, and wherein the passive resistive device of the filter component is fabricated in one or more metal layers of the plurality of metal layers.

9. The circuit as recited in claim 1 wherein the passive inductive device of the filter component is disposed within the interposer component.

10. The circuit as recited in claim 9 wherein the passive inductive device comprises a spiral inductor.

11. The circuit as recited in claim 1 wherein the passive inductive device of the filter component is disposed upon a surface of the interposer component.

12. The circuit as recited in claim 11 wherein the passive inductive device comprises a wire bond inductor.

13. The circuit as recited in claim 11 wherein the passive inductive device comprises an inductor external to the interposer component and disposed upon a surface of the interposer component.

14. A method comprising:
transmitting a data signal from a transmitter to a receiver across a conductor disposed in an interposer, wherein the conductor interconnects the receiver and the transmitter; and
low-passing the data signal with a filter comprising a passive resistive element disposed within the interposer and coupled in series electrically with a passive inductive element, wherein the filter is coupled to the conductor in a shunt configuration with respect to a ground potential.

15. The method as recited in claim 14 wherein the data signal comprises a single ended transaction between the transmitter and the receiver.

16. The method as recited in claim 14:
wherein the conductor comprises a first conductor,
wherein the interposer comprises a second conductor disposed within the interposer, wherein the second conductor interconnects the receiver and the transmitter,
wherein the data signal comprises a two ended differential between a first signal component and a second signal component, and
wherein the transmitting comprises sending the first signal component across the first conductor, the transmitting further comprising sending the second signal component across the second conductor.

17. The method of claim 14, which the passive inductive component is disposed within the interposer component.

18. An electronic device comprising:
a printed circuit board (PCB);
receiver circuitry and transmitter circuitry that are coupled to the PCB, wherein the receiver circuitry and the transmitter circuitry are communicably coupled to each other via a conductor;
an interposer mounted on the PCB;
a passive equalizer coupled to the conductor, wherein the passive equalizer is configured in a shun configuration relative to a ground potential for low passing a signal transmitted between the receiver circuitry and the transmitter circuitry, wherein the passive equalizer comprises a passive resistor and a passive inductor, and wherein further the passive equalizer is electrically coupled to the conductor without using a conductive lead or a connector on the PCB.

19. The electronic device of claim 18 wherein the passive resistor and the passive inductor are each disposed within the interposer.

20. The electronic device of claim 18 wherein the passive inductor is disposed on a surface of the interposer and coupled to the conductor via a through-silicon via (TSV) routed at least partially within the interposer.

* * * * *